United States Patent
Hill

(10) Patent No.: US 6,281,614 B1
(45) Date of Patent: *Aug. 28, 2001

(54) MULTIPLE PHASE ELECTRIC MACHINE WITH A SPACE-OPTIMIZED TURN-TO-TURN WINDING

(76) Inventor: Wolfgang Hill, Ortenbergstr. 3, D-76135 Karlsruhe (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,304

(22) Filed: Jan. 26, 1999

Related U.S. Application Data

(63) Continuation of application No. PCT/DE97/01667, filed on Aug. 1, 1997, now abandoned.

(51) Int. Cl.⁷ ........................................................ H02K 3/12
(52) U.S. Cl. ........................................ 310/207; 310/201
(58) Field of Search ........................................ 310/179, 201, 310/207, 268

(56) References Cited

U.S. PATENT DOCUMENTS

| | | | |
|---|---|---|---|
| 3,634,708 | * | 1/1972 | Fisher .................................... 310/195 |
| 4,187,441 | * | 2/1980 | Oney ..................................... 310/112 |
| 5,508,577 | * | 4/1996 | Shiga et al. ........................... 310/201 |
| 5,744,896 | * | 4/1998 | Kessinger, Jr. et al. ............. 310/268 |

FOREIGN PATENT DOCUMENTS

| | | | | |
|---|---|---|---|---|
| 1005611 | * | 4/1957 | (DE) . | |
| 1025058 | * | 2/1958 | (DE) . | |
| 4125044 | * | 2/1993 | (DE) | ............................... H02K/3/04 |
| 4234145 | * | 2/1994 | (DE) | ............................... H02K/3/04 |
| 4321236 | * | 8/1994 | (DE) | ............................... H02K/3/12 |
| WO95/00997 | * | 1/1995 | (DE) | .................................... 310/179 |

* cited by examiner

Primary Examiner—Karl Tamai

(57) ABSTRACT

Known turn-to-turn windings with overlapping conductor lanes either only insufficiently use the groove space or are difficult to produce. In addition, uniform distribution of current density is not achieved in the winding overhang space. The disclosed multiple phase conductor layers are made of identical conductor lanes located in the groove space at the same distance from the air gap surface. The conductor layers stacked in the grooves complement each other in the use of the winding overhang space in that they lead the current in opposite directions across the width of the groove. Uniform distribution of current density and high space utilization are achieved in that the layered winding overhangs are offset in relation to the layers in the grooves in direction of the groove depth by one half the height of a layer. Each conductor lane occupies two winding overhang layers when passing through the winding overhangs, the transition between layers taking place at about the middle of the middle of the connection section at the outside of the winding overhangs. The conductor layers once removed are connected with each other. Motors and generators equipped with space-optimized turn-to-turn windings are characterized by high efficiency and power density.

9 Claims, 3 Drawing Sheets

MULTIPLE PHASE ELECTRIC MACHINE WITH A SPACE-OPTIMIZED TURN-TO-TURN WINDING

This is a continuation of PCT/DE97/01667, filed Aug. 1, 1997, now abandoned.

BACKGROUND OF THE INVENTION

1. Field of the Invention

The invention concerns a multiple phase electric machine with a turn-to-turn winding as well as a process for the production of such machines.

2. Description of the Prior Art

Good space utilization in the winding overhangs due to short connection paths and large conductor cross sections create favorable conditions for an increase in power density and efficiency.

Although it is possible to achieve high groove space factors by means of turn-to-turn windings consisting of conductor layers of rectangular cross section which are stacked in direction of the groove depth, their production remains a problem.

In the three-layer winding described in DE-AS 1,005,611 all three layers are bent at different angles towards the shaft.

From DE-AS 1,025,058 a single-layer rotor winding with groove bars is known in which the intersection problem is solved by bending the groove bar only on one side by the full height of the layer towards the shaft and always designing adjacent groove bar ends differently.

U.S. Pat. No. 3,634,708 shows an air-core winding which consists of a conductor layer. In the active portion, the thickness of the armature corresponds to a single conductor thickness. Alternate conductors, as they extend into the crossover portion, occupy two contiguous planes, one of which is a continuation of the single wire thickness plane of the active portion of the winding.

U.S. Pat. No. 4,187,441 relates to brushless electric machines with a multiple disk, pancake, rotor, and stator structure. Elimination of excess stator yoke material would therefore contribute to the realization of increased power density in an electric machine. The stator winding is without special features.

U.S. Pat. No. 5,744,896 shows a brushless electromotive device with a flat coil structure operating with an axially oriented magnetic field. Several flat stator coils lie adjacent to one another and overlap each other. The thickness of the coil and magnetic flux gap is minimized by forming the radially extending side portions of a wire-wound coil in axial direction. Each coil is substantially of the same trapezoidal shape, but the radially extending side portions are coplanar in a different manner.

Furthermore, turn-to-turn windings made of prefabricated conductor parts that are free of bending radii are known. For instance, in DE 41 25 044 C2 multi-phase conductor layers are described in which the conductor cross section in the winding overhangs varies. The number of different conductor designs corresponds to the number of phases resulting in uniform distribution of current density in the winding overhang space.

In DE 42 34 145 C1 turn-to-turn windings are described whose conductor lanes of different phases yield to each other in the winding overhang in direction of the groove depth and thereby utilize the space in front of the yoke. The length of the conductor is therefore dependent on the groove depth and conductor lanes of different phases are of different designs.

From DE 43 21 236 C1 a turn-to-turn winding is known that is characterized by intertwined conductor lanes. Conductor lanes of a double layer can not be produced independently of each other. The conductor layers consist of many individual parts that have to be positioned into their final location prior to joining them.

The objective of the present invention is to advance a multiple phase electric machine with overlapping conductor lanes in such a manner that short connection paths and complete and uniform space utilization in the winding overhangs is achieved at the lowest possible production cost.

SUMMARY OF THE INVENTION

In accordance with the invention, this objective is achieved by th characteristics of claims 1 and 8. In accordance with the invention, all conductor lanes of a conductor layer are identical. In the winding overhangs, sections of the conductor lanes are aligned concurrently in direction of the groove length and the groove width. Each pass through a winding overhang consists of two such sections that lie in different layers of the winding overhang and these layers of the winding overhang, in relation to the layers in the grooves, are set off by one half the conductor height in direction of the groove depth.

The transition from a layer in the groove to one in the winding overhang occurs preferably in a continuous transition retaining the height of the conductor. In the middle of each pass through the winding overhang the conductor lane changes over into another layer of the winding overhang. Following the second diagonal section a second transition returns the conductor lane, again by one half the height of the layer, back into the original groove layer. Thus, the two transition zones compensate the distance covered during the change of the layer in direction of the groove depth.

On the other hand, if the change of a layer on the outside of the winding overhang is a change of a conductor layer, then the change of the layer and also the second transition of this pass through the winding overhang occur in the same direction of the groove depth as the first transition. Here, not adjacent layers but always the conductor layers once removed are switched in series. Conductor layers stacked in the grooves conduct the current in the winding overhangs in opposite directions with reference to the groove width. They belong to the same phase and can be switched parallel as well as in series outside the winding overhangs.

Because the conductor configuration does not require variations in the conductor cross section, the conductor lanes can also be produced by deformation of profile wire. The identical meander-shaped conductor parts can also be produced in one piece and free of bending radii as sintered or cast part. For larger conductor cross sections, the conductor parts are preferably assembled from a multitude of identical conductor elements that have been prefabricated to exact dimensions by, e.g. drop forging. Joining of the conductor layers is accomplished by, e.g. electron or laser beam, prior to the application of insulation.

Advantageous embodiments of the invention are displayed in the drawings.

DETAILED DESCRIPTION OF THE PREFERRED EMBODIMENT

Figure 1:
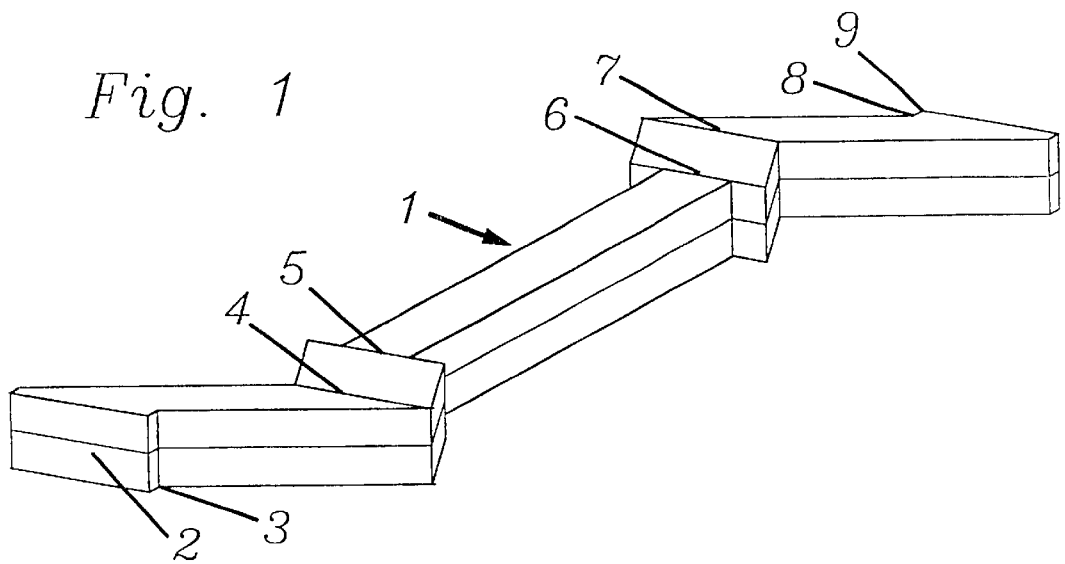
FIG. 1 shows a conductor element that corresponds to the conductor configuration for one pole pitch.

In FIG. 1 the conductor element (1) shown in linearized form corresponds to the smallest subdivision of a conductor lane into identical conductor elements. Each of the two ends (2) and (9) are a part of the outer surface of the winding overhangs. This typical configuration can be divided into seven subdivisions where the middle section (5–6) is arranged within a groove. After leaving the groove, the conductor lane continues in so-called transition zones (4–5) and (6–7) in direction of the groove length and also concurrently in direction of the groove depth, each transitional section covering on its respective side of the middle section a distance in opposite directions of the groove depth that corresponds to one half of the height of the conductor. Sections (3–4) and (7–8) are, therefore, arranged in winding overhang layers at a different distance to the air gap surface. They are progressing concurrently in direction of the groove length and the groove width. At the ends of the conductor element (1) extensions (2–3) and (8–9) in direction of the groove length are provided in order to avoid a narrowing of the conductor cross section when changing over to another layer.

Figure 2:
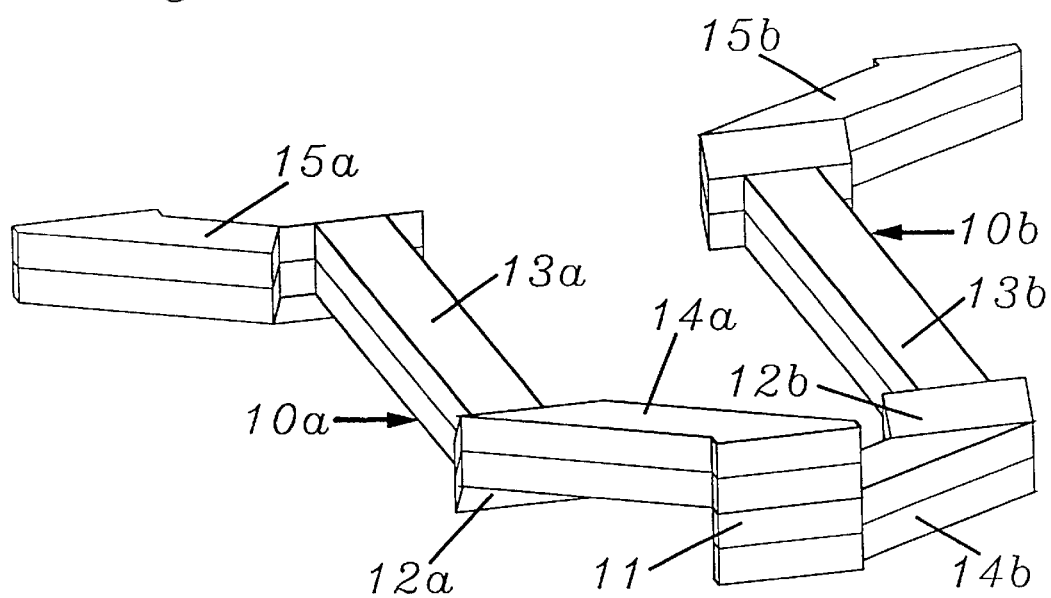
FIG. 2 shows two conductor elements joined together.

As shown in FIG. 2, this change-over occurs when the conductor ends of two identical conductor elements (10 a,b) are stacked in direction of the groove depth at the outsides of the winding overhang. The distance covered in direction of the groove depth at the change-over location (11) is compensated within a conductor layer by the two transition zones (12a,b). The sections in the grooves (13a,b) connected in this manner show the same distance to the air gap surface. In the winding overhangs the diagonal sections (14a,b) and (15a,b) respectively are also arranged in layers parallel to the air gap. A conductor layer is, therefore, always composed of two winding overhang layers that are stacked and one groove layer wherein the winding overhang layers are set off in relation to the groove layer by one half of the height of a layer.

Figure 3:
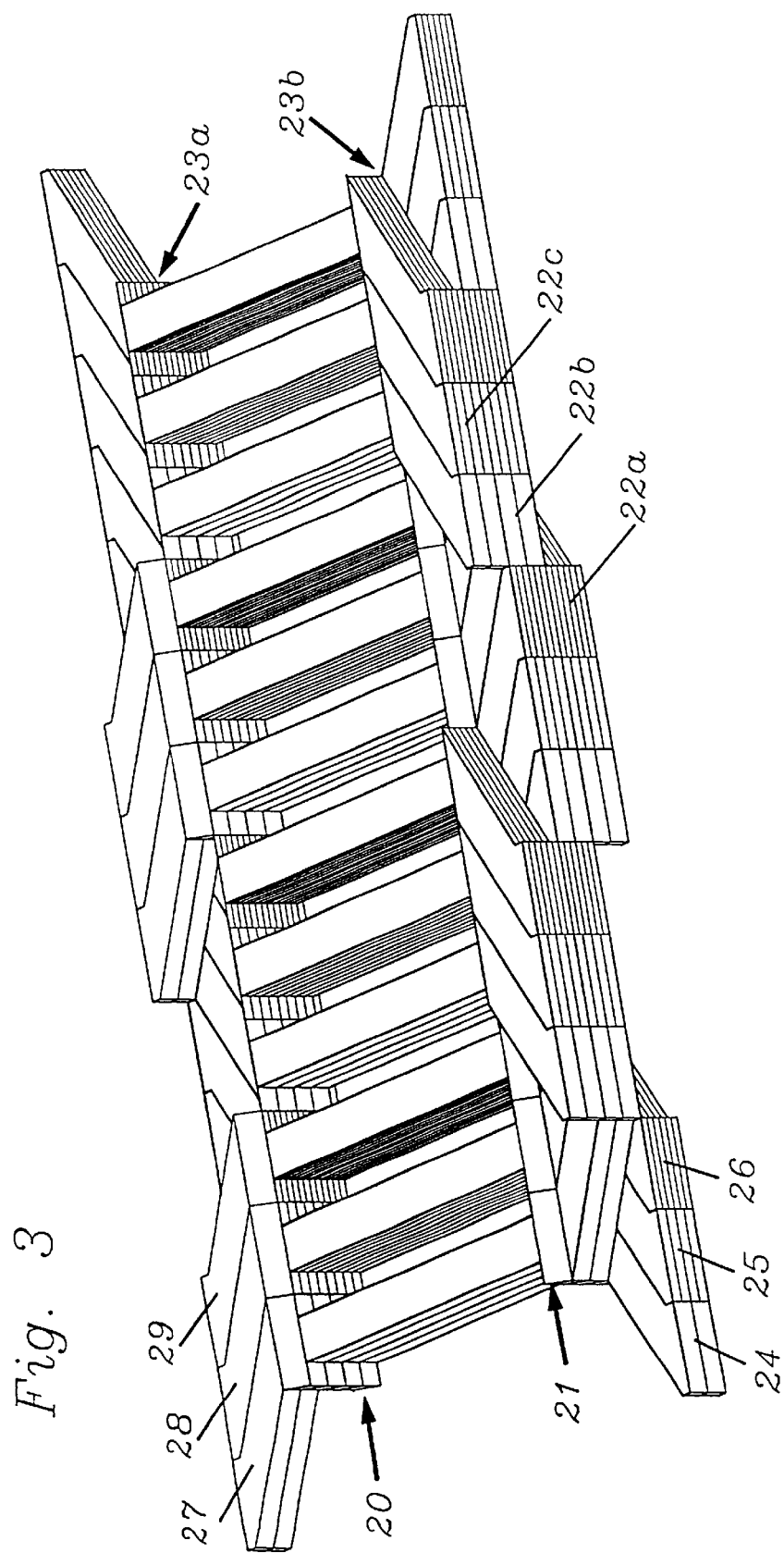
FIG. 3 shows a linearized cutout of two stacked three-phase conductor layers.

While a conductor layer occupies its groove layer alone, it shares each of its two winding overhang layers with one of the adjacent conductor layers. This layer design is illustrated in FIG. 3 by a cutout comprising four pole pitches of two stacked three-phase conductor layers (20, 21). The two conductor layers utilize together three winding overhang layers (22a–c) jointly completely filling the middle winding overhang layer (22b). Furthermore, the conductor layers (20, 21) stacked in the grooves conduct the current in the winding overhangs (23a,b) in opposite directions in relation to the groove width. Each conductor layer consists of identical conductor lanes (24–29) the number of which corresponds to the number of phases and which are differently densely hatched.

Figure 4:
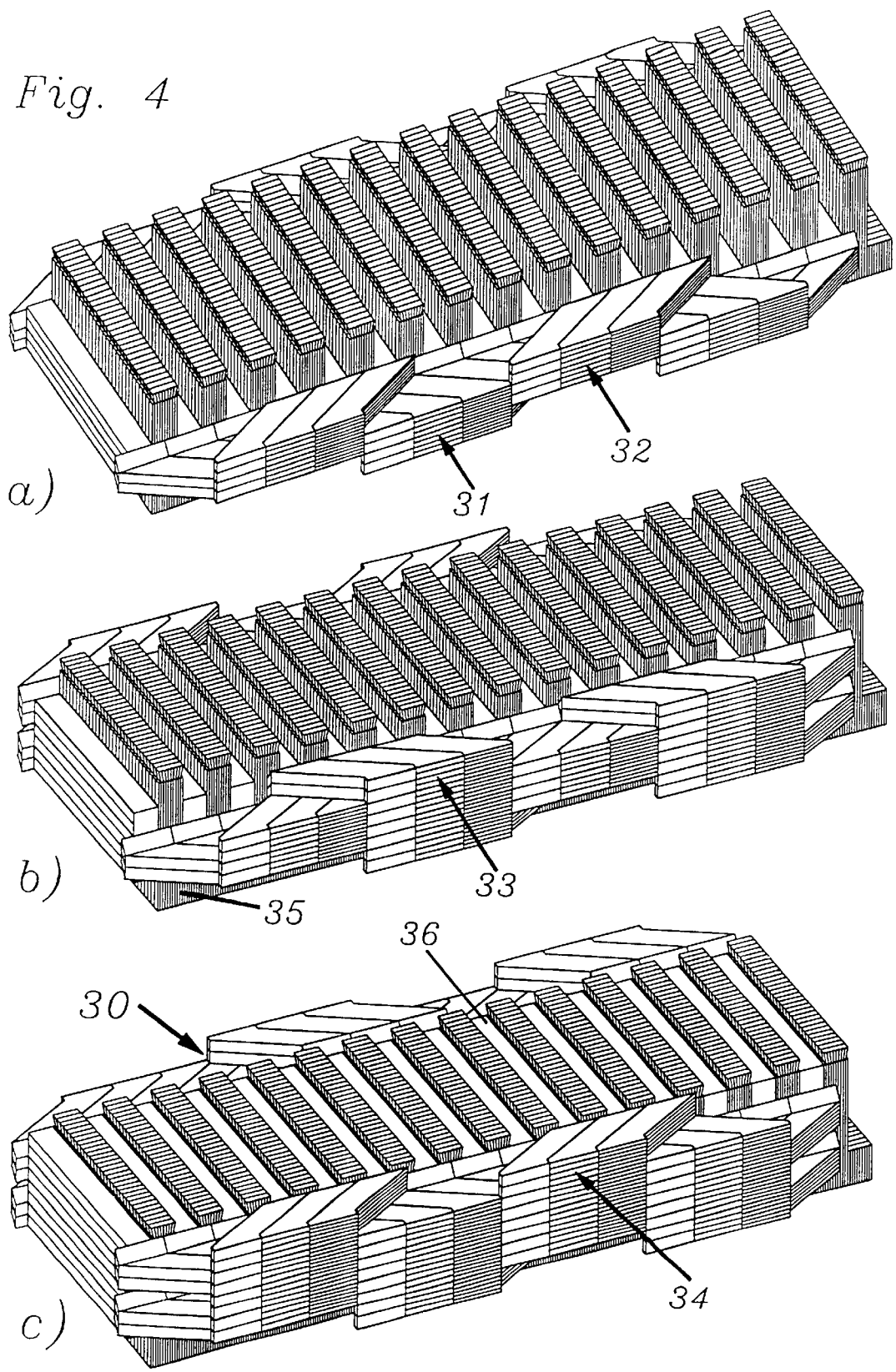
FIG. 4 shows in three cutouts the insertion of a three-phase, four-layer turn-to-turn winding into a grooved soft magnetic body of a linear motor.

In FIG. 4 the insertion of a four-layer winding (30) into the grooved soft magnetic body (35) of a linear motor is shown in three successive work steps. While in FIG. 4a the two lower conductor layers (31, 32), analogous to FIG. 3, form a compact package, a third conductor layer (33) is added in FIG. 4b and the uppermost conductor layer (34) is added in FIG. 4c. The conductor lanes of each layer can, therefore, be inserted individually or as a ready-to-function package into the grooved soft magnetic body (35). The open grooves (36) are closed by partially soft magnetic retainer keys (not shown).

By bending around various axes the illustrated linear design can be adapted to axial and/or radial flux machines.

What is claimed is:

1. Multiple phase electric machine with at least one soft magnetic body with grooves,
    said grooves having a length, a width, and a depth, and said grooves interrupting a groove surface of said soft magnetic body,
    within said grooves being arranged a part of a layered winding, and other parts of said layered winding being arranged outside said soft magnetic body in winding overhangs,
    said layered winding consisting of conductor lanes of different phases,
    said conductor lanes in said grooves possessing groove layers with surfaces that are approximately parallel to said groove surface of said soft magnetic body,
    distance between said surfaces of said conductor lanes, which are parallel to the grooved surface, corresponding to a height of said conductor lanes in direction of said groove death,
    sections of said conductor lanes of different phases that are arranged in said grooves and that possess the same distance to said groove surface of said soft magnetic body comprising together a multiple phase conductor layer,
    said conductor lanes of different phases within said multiple phase conductor layer are overlapping in said winding overhangs by being aligned concurrently in direction of said groove length and in direction of said groove width,
    and a change-over in comparison to the groove layers, between winding overhang layers stacked in said winding overhangs occurring in each pass of said conductor lanes through said winding overhangs, wherein
    each said conductor lane within said winding overhangs is arranged in winding overhand layers with surfaces parallel to the groove surface and said winding overhang layers are offset in relation to the said groove layers by a fraction (=value smaller than 1) of said height of said conductor lanes in direction of said groove depth.

2. Multiple phase electric machine in accordance with claim 1, wherein
    said winding overhangs have outsides in which said change-over between winding overhang layers is arranged,
    between said outsides of said winding overhangs said conductor lane possesses at least three sections parallel to said groove surface,
    said three sections being connected by two transitional sections, and said conductor lane covering a distance in direction of said groove depth in said transitional sections.

3. Multiple phase electric machine in accordance with claim 1, wherein said conductor lanes between said change-over of layers possess a constant conductor height in direction of said groove depth.

4. Multiple phase electric machine in accordance with claim 1, wherein
    said conductor lanes are composed of identical conductor elements that correspond to a portion of said conductor lanes between two successive said change-overs between winding layers.

5. Multiple phase electric machine in accordance with claim 1, wherein the conductor cross section of said conductor lanes at the transition from said groove to said winding overhang is enlarged in direction of said groove width and said conductor elements at their two respective ends are elongated in direction of said groove length.

6. Multiple phase electric machine in accordance with claim 1, wherein in linear machines and in machines divided into sectors said conductor layers terminate in end sections that correspond to middle sections, said middle sections being arranged between the winding overhangs, said end sections having end surfaces facing in direction of said groove width and said end sections of said conductor layers are connected in pairs at said end surfaces.

7. Multiple phase electric machine in accordance with claim 1, wherein the entire mass of a conductor lane of one of said phases in one multiple phase conductor layer is a unitary conductor part, said unitary conductor part is provided with electrical insulation, identical said unitary conductor parts forming a multiple phase conductor layer of said layered winding, said unitary conductor parts are in the area of said groove separated by a multiple phase conductor layer that is set off by one pole pitch, and in a layered winding with at least two multiple phase conductor layers said unitary conductor parts of one phase are joined electrically conductive at the outside of said winding overhangs.

8. Multiple phase electric machine in accordance with claim 1, wherein a conductor lane of one of said phases in one multiple phase conductor layer having a meander-shaped configuration, said meander-shaped configuration having in direction of said groove depth a height and rim ranges, where said change-over of said winding overhang layers occurs, said meander-shaped configuration possessing at its rim ranges twice the height in relation to the sections between said rim ranges, and said meander-shaped configuration is a prefabricated conductor part with an insulation layer on its surface, a number of identical said conductor parts corresponding to said number of phases of said electric machine forming a multiple phase conductor layer comprising several pole pitches by pushing together identical said conductor parts, said multiple phase conductor layer having a height that is corresponding to said height of said configuration.

9. Multiple phase electric machine with a layered winding, said layered winding consisting of at least two multiple-phase conductor layers, each of said multiple-phase conductor lavers having a thickness and meander-shaped conductor lanes of different phases, said conductor lanes overlapping in two winding overhangs of said multiple chase conductor layers, between said two winding overhangs said meander-shaped conductor lanes having middle sections, said middle sections having a height in direction of said thickness of said multiple phase conductor layers, said thickness of said multiple phase conductor laver corresponding between said winding overhangs to said height of said middle sections, in said winding overhangs of one multiple phase conductor laver using two winding overhang layers, said two winding overhang layers being offset against said middle sections of said conductor lanes, between said middle sections and sections of said conductor lanes in said winding overhangs being transition sections of said conductor lanes which realize said offset, and said conductor lanes of said at least two multiple phase conductor layers stacked between said winding overhangs being offset perpendicularly to said direction of said conductor height and using in said winding overhangs partially the same winding overhang layer.

* * * * *